United States Patent
Kazui et al.

(10) Patent No.: US 9,479,781 B2
(45) Date of Patent: Oct. 25, 2016

(54) MOTION VIDEO ENCODING APPARATUS, MOTION VIDEO ENCODING METHOD, AND MOTION VIDEO ENCODING COMPUTER PROGRAM

(71) Applicant: FUJITSU LIMITED, Kawasaki-shi, Kanagawa (JP)

(72) Inventors: Kimihiko Kazui, Kawasaki (JP); Satoshi Shimada, Kawasaki (JP); Akira Nakagawa, Sagamihara (JP); Hidenobu Miyoshi, Kawasaki (JP); Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 651 days.

(21) Appl. No.: 13/938,952

(22) Filed: Jul. 10, 2013

(65) Prior Publication Data
US 2013/0294502 A1 Nov. 7, 2013

Related U.S. Application Data

(63) Continuation of application No. PCT/JP2011/050762, filed on Jan. 18, 2011.

(51) Int. Cl.
*H04N 7/12* (2006.01)
*H04N 19/625* (2014.01)
(Continued)

(52) U.S. Cl.
CPC ...... *H04N 19/00812* (2013.01); *H04N 19/124* (2014.11); *H04N 19/149* (2014.11); *H04N 19/152* (2014.11); *H04N 19/174* (2014.11); *H04N 19/91* (2014.11)

(58) Field of Classification Search
CPC ............... H04N 19/00812; H04N 19/124; H04N 19/149; H04N 19/152; H04N 19/174; H04N 19/91
USPC .......................................... 375/240.2, 240.23
See application file for complete search history.

(56) References Cited

U.S. PATENT DOCUMENTS 5,235,618 A 8/1993 Sakai et al.
5,844,611 A * 12/1998 Hamano ................. H03M 7/42
375/240.2

(Continued)

FOREIGN PATENT DOCUMENTS

JP 3-9684 1/1991
JP 3-148981 6/1991

(Continued)

OTHER PUBLICATIONS

International Search Report mailed Apr. 12, 2011 for corresponding International Application No. PCT/JP2011/050762.

(Continued)

*Primary Examiner* — Farzana Hossain
(74) *Attorney, Agent, or Firm* — Staas & Halsey LLP

(57) ABSTRACT

A motion video encoding apparatus includes: a group determining unit which determines, for each block, a group to which the block belongs; a group decode time information computing unit which computes a decode time for each group; a code amount control unit which controls, for each group, an amount of code resulting from entropy encoding each block in the group so that data needed for decoding all of the blocks in the group arrives at a stream receive buffer by a decode time of the group when the data is transmitted at a prescribed transmission rate; a compression unit which compresses the data of each block based on the amount of code of the block; an entropy encoding unit which entropy-encodes the compressed data of each block; and a decode information appending unit which appends, to data to be output, correction information for the decode time of each group.

9 Claims, 9 Drawing Sheets

(51) Int. Cl.
*H04N 19/149* (2014.01)
*H04N 19/124* (2014.01)
*H04N 19/91* (2014.01)
*H04N 19/152* (2014.01)
*H04N 19/174* (2014.01)

(56) References Cited

U.S. PATENT DOCUMENTS 9,237,342 B2 * 1/2016 Koyama .......... H04N 19/00278
2002/0001344 A1   1/2002 Morris et al.
2009/0310670 A1 * 12/2009 Odagawa ................ H04N 7/24
                                                           375/240.01
2010/0303147 A1  12/2010 Miyazaki

FOREIGN PATENT DOCUMENTS

JP    2003-535523    11/2003
JP    2010-278668    12/2010

OTHER PUBLICATIONS

"Test Model 5," ISO-IEC/JTC1/SC29/WG11/N0400, International Organisation for Standardisation, Apr. 1993, pp. 1-119.

M. Winken et al., "Description of video coding technology proposal by Fraunhofer HHI," Joint Collaborative Team on Video Coding (JCT-VC) of ITU-T SG16 WP3 and ISO-IEC/JTC1/SC29/WG11, Apr. 2010, pp. 1-44.

* cited by examiner

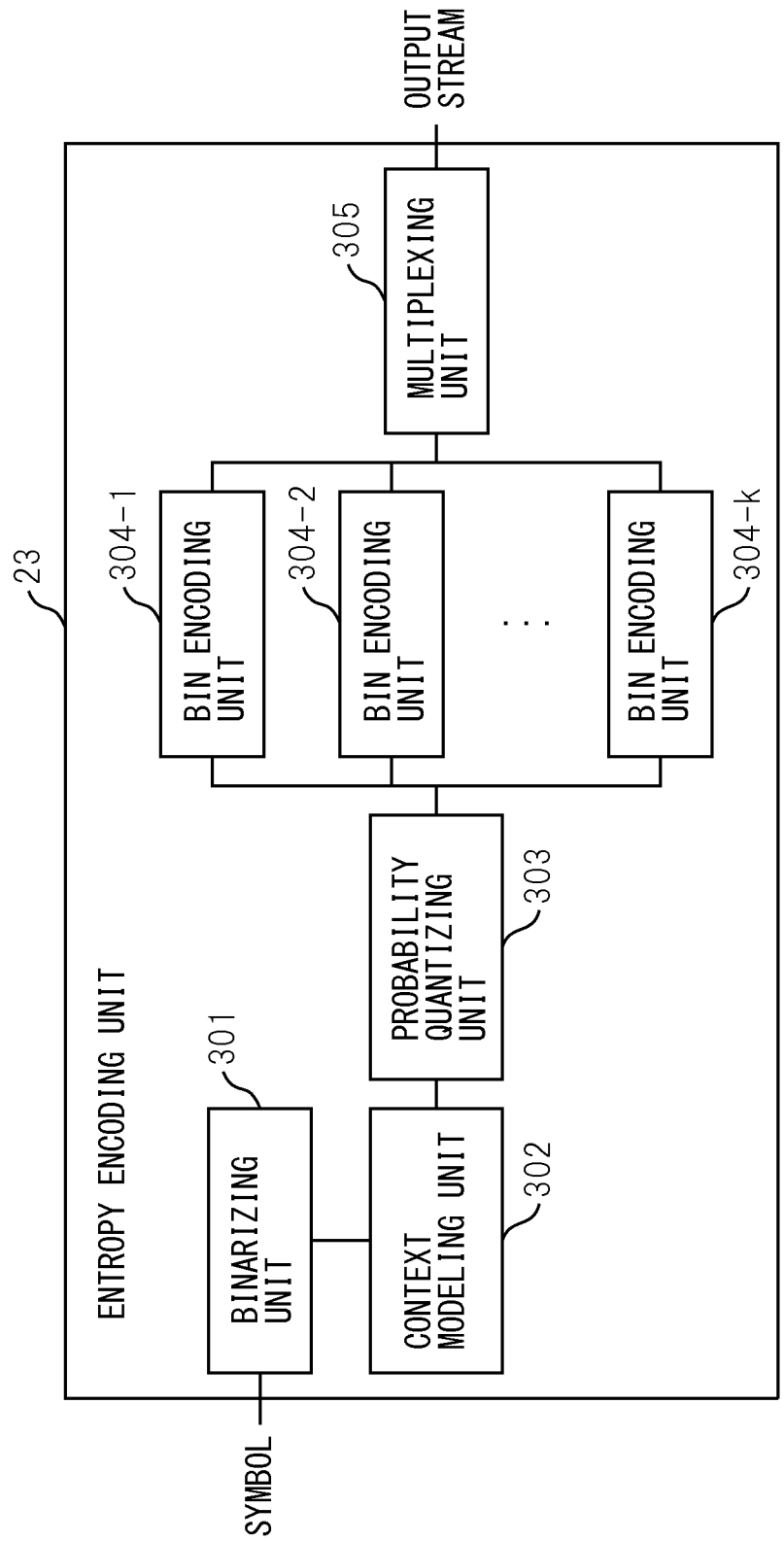

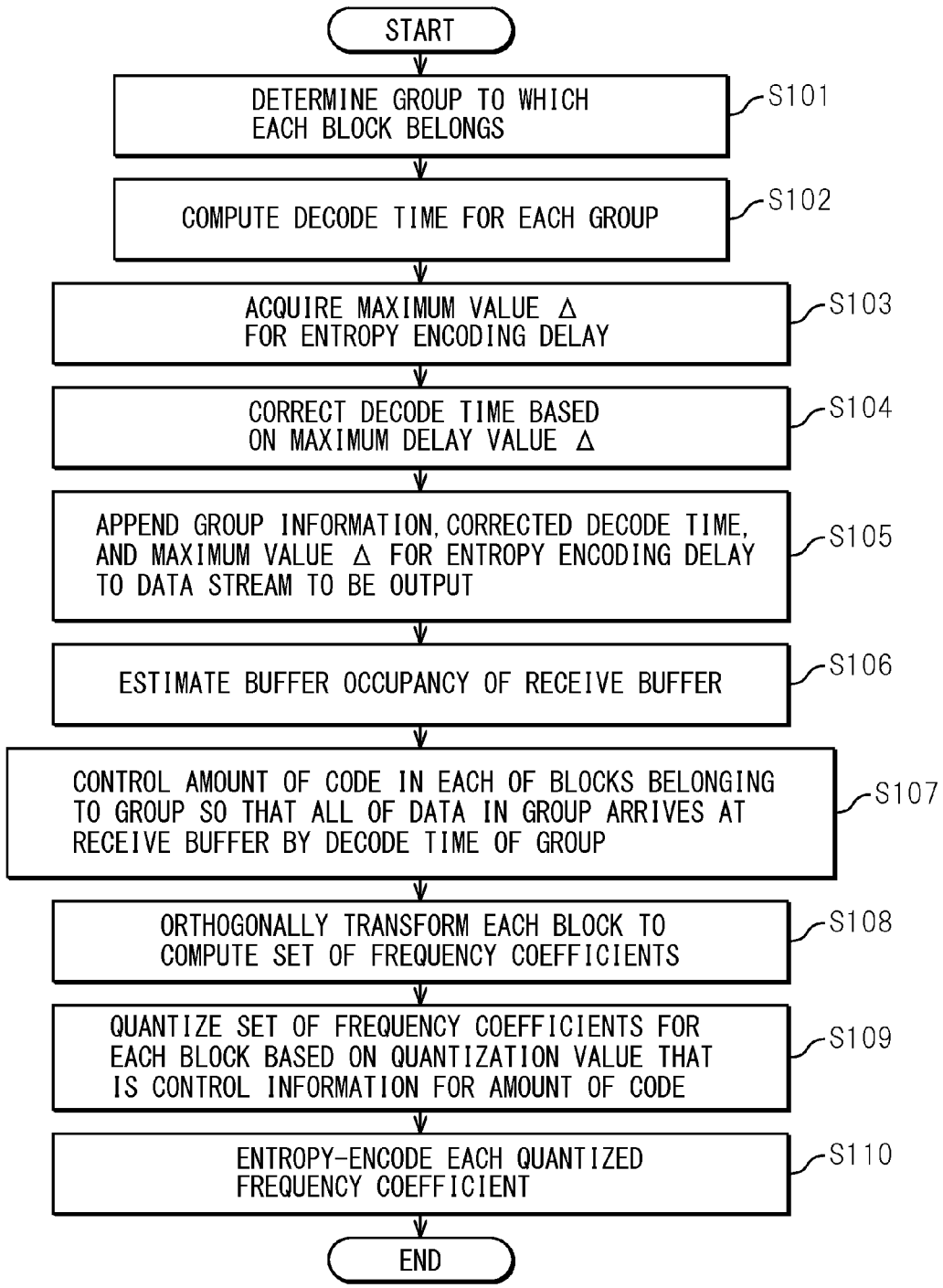

MOTION VIDEO ENCODING APPARATUS, MOTION VIDEO ENCODING METHOD, AND MOTION VIDEO ENCODING COMPUTER PROGRAM

CROSS-REFERENCE TO RELATED APPLICATION

This application is a continuation application and is based upon PCT/JP2011/50762, filed on Jan. 18, 2011, the entire contents of which are incorporated herein by reference.

FIELD

The present invention relates to a motion video encoding apparatus, motion video encoding method, and motion video encoding computer program for encoding each picture on a block-by-block basis, for example, by dividing the picture into a plurality of blocks.

BACKGROUND

Motion video data generally has a very large amount of data. Thus, an apparatus which deals with motion video data compresses the motion video data by encoding the motion video data when transmitting the motion video data to another apparatus or storing the motion video data in a storage apparatus. As typical encoding standards for motion videos, Moving Picture Experts Group phase 2 (MPEG-2), MPEG-4, or H.264 MPEG-4 Advanced Video Coding (MPEG-4 AVC/H.264) formulated by the International Standardization Organization/International Elecrotechnical Commission (ISO/IEC) are in wide use.

Such encoding standards adopt an inter-coding method of encoding a picture to be encoded using information on the picture to be encoded and pictures preceding and succeeding the picture to be encoded, and an intra-coding method of encoding the picture to be encoded using only the information on the picture itself.

In general, the amount of code of a picture or a block encoded by the inter-coding method is smaller than the amount of code of a picture or a block encoded by the intra-coding method. Thus, the amount of code for a picture varies within a sequence, depending on a selected encoding mode. Similarly, the amount of code in a block varies within a picture, depending on the selected encoding mode.

Thus, a transmit buffer for data streams is provided in a transmitting apparatus, and a receive buffer for data streams is provided in a receiving apparatus so as to allow a data stream containing encoded motion video to be transmitted at a constant transmission rate even when the amount of code temporally varies. The delay caused by these buffers (hereinafter referred to as a buffer delay) is a major factor in a delay between the input of each picture to an encoder and the display of each decoded picture by a decoder (hereinafter referred to as a display delay). The buffer delay and the display delay are shortened by reducing the sizes of the buffers. However, reducing the sizes of the buffers also reduces the degree of freedom (the degree of a variation in the amount of code) in code allocation for each picture, resulting in degraded image quality of reproduced motion videos.

MPEG-2 and MPEG-4 AVC/H.264 define the operation of a receive buffer in an idealized decoder referred to as the video buffering verifier (VBV) or the coded picture buffer (CPB), respectively. A motion video encoder has to control the amount of code so that the receive buffer in the idealized decoder neither overflows nor underflows. It is stipulated that the idealized decoder performs instantaneous decoding that takes zero time to decode. Japanese Laid-open Publication No. H03-148981, for example, discloses a motion video encoder control method concerning the VBV.

SUMMARY

In order not to cause the receive buffer in the idealized decoder to overflow or underflow, the moving video encoder controls the amount of code to guarantee that all of the data of any given picture will have been stored in the receive buffer by the time the idealized decoder decodes the given picture.

When the motion video encoder transmits a data stream at a constant transmission rate, the receive buffer may underflow when the amount of code in each picture is large and when transmission of the data needed to decode the picture is not completed by the time when the picture is to be decoded and displayed by the motion video decoder. In other words, the receive buffer may underflow when the data needed to decode the picture is not yet stored in the decoder's receive buffer. If this happens, the motion video decoder will become unable to perform decoding, and frame skipping will occur.

The motion video decoder therefore displays the picture after delaying the stream by a prescribed time from its receive time so that the decoding can be done without causing the receive buffer to underflow.

As described above, it is stipulated that the idealized decoder accomplishes decoding in zero time. As a result, when the input time of the i-th picture to the motion video encoder is $t(i)$, and the decode time of the i-th picture at the idealized decoder is $dt(i)$, then the time at which the picture becomes ready for display is also $dt(i)$. Since the picture display period $\{t(i+1)-t(i)\}$ is equal to $\{dt(i+1)-dt(i)\}$ for any picture, the decode time $dt(i)$ is given as $dt(i)=t(i)+dly$, i.e., the time delayed by a fixed time dly from the input time $t(i)$. This means that the motion video encoder has to complete the transmission of all of the data needed for decoding to the receive buffer by the time $dt(i)$.

Referring to FIG. 1, a description will be given of how the conventional receive buffer operates. In FIG. 1, the abscissa represents the time, and the ordinate represents the buffer occupancy of the receive buffer. Solid line graph 100 illustrates the buffer occupancy as a function of time.

The buffer occupancy of the receive buffer is restored at a rate equal to the transmission rate, and the data used for decoding each picture is retrieved from the buffer at the decode time of the picture. The data of the i-th picture begins to be input to the receive buffer at time $at(i)$, and the final data of the i-th picture is input at time $ft(i)$. The idealized decoder completes the decoding of the i-th picture at time $dt(i)$, whereupon the i-th picture becomes ready for display.

While the idealized decoder is an instantaneous decoder, the actual motion video decoder takes a finite time to decode a picture; generally, the decoding processing time for one picture is shorter than the picture display period, but the decoding requires a length of time close to the picture display period. The data of the i-th picture is input to the receive buffer during the period starting at time $at(i)$ and ending at time $ft(i)$, but there is no guarantee at which of the times $at(i)$ to $ft(i)$ the data needed for decoding a given block will arrive. The actual motion video decoder therefore begins to decode the i-th picture at time $ft(i)$. As a result, the actual motion video decoder can only guarantee to complete the decoding by time ft(i)+ct, where ct is the worst-case processing time needed to decode one picture.

What the actual motion video encoder guarantees is that the data needed for decoding the picture will arrive at the decoder's receive buffer by the time dt(i), i.e., ft(i) will not be later than dt(i). As a result, when the delay of ft(i) is the longest, ft(i) becomes equal to dt(i). In this case, the time at which the decoding is guaranteed to complete is dt(i)+ct. When all the pictures are to be displayed at a constant picture rate, the motion video decoder has to delay the display time of each picture at least by ct compared with the idealized decoder.

As described above, the provision for the operation of the stream receive buffer of the idealized decoder according to MPEG-2 and MPEG-4 AVC/H.264 specifies the need for all the bits of a certain picture to arrive at the stream receive buffer before the picture is decoded.

Thus, MPEG-2 adopts an entropy encoding scheme in order to reduce the amount of the data of each block in the picture by compression. The entropy encoding scheme according to MPEG-2 converts a bit sequence in a bitstream indicative of the compressed data (header information such as motion vectors and quantized orthogonal transform coefficients) of a certain block in the picture which is to be encoded into another bit sequence, for example, in accordance with a conversion map. Such a conversion process can be carried out at a very high speed. Thus, a delay time from the start of entropy encoding of the compressed data until the encoded bit sequence is generated as a stream is substantially zero. In other words, the time when an encoding process completes up to a certain block is almost the same as the time of input to the transmit buffer. Hence, the encoder can control the amount of code in the compressed data of the picture so as to easily satisfy the provision for the operation of the receive buffer.

On the other hand, MPEG-4 AVC/H.264 adopts, in addition to the scheme adopted by MPEG-2, an arithmetic encoding scheme as an entropy encoding scheme. The arithmetic encoding scheme processes the compressed data of a certain block in the picture which is to be encoded on a symbol-by-symbol basis to generate a stream. In this case, a delay (hereinafter referred to as an entropy encoding delay) from the start of entropy encoding of a symbol for the last compressed data of a block of interest until an encoded bit sequence is generated as a stream is generally not zero. The encoded bit sequence corresponding to the last symbol for the block of interest may fail to be generated as a stream when the entropy encoding of several symbols for the compressed data of the next block is not started. In other words, a difference corresponding to an entropy encoding delay may occur between the number of bits (the apparent amount of information generated in the picture) transmitted to the transmit buffer from the beginning until the end of a coding process for a certain picture and the actual amount of information generated in the picture. Thus, even when the encoder controls the amount of information so as to prevent a delay in the time required to decode the picture in accordance with the apparent amount of information generated in the picture, the time when all the bits in the actual picture arrive at the receive buffer is delayed in proportion to the entropy encoding delay. Hence, constraints based on the provision for the operation of the receive buffer may fail to be met, depending on the amount of the entropy encoding delay.

Moreover, as an entropy encoding scheme, a scheme has been proposed in which a symbol probability distribution is quantized to allow arithmetic encoding to be performed in parallel (see, for example, JCTVC-A116, "Description of video coding technology proposal by Fraunhofer HHI," Joint Collaborative Team on Video Coding of ITU-T SG16 WP3 and ISO/IEC JTC1/SC29/WG11, April 2010). When the encoder encodes the compressed data of each block in accordance with the entropy encoding scheme, a possible entropy encoding delay may have a very large worst value (for example, 4,096 bits). The large worst value of the entropy encoding delay may prevent the provision for the operation of the receive buffer of the idealized decoder from being met.

According to one embodiment, a motion video encoding apparatus for encoding each picture contained in motion video data by dividing the picture into a plurality of blocks is provided. The motion video encoding apparatus includes: a group determining unit which determines, for each block, a group to which the block belongs, among a plurality of groups into which the picture is divided; a group decode time information computing unit which computes a decode time for each group; a code amount control unit which controls, for each group, an amount of code resulting from entropy encoding of data of each block contained in the group so that data needed for decoding all of the blocks contained in the group will arrive at a stream receive buffer provided in a motion video decoding apparatus by the decode time of the group when the data is transmitted to the motion video decoding apparatus at a prescribed transmission rate; a compression unit which compresses the data of each block based on the amount of code of the block; an entropy encoding unit which entropy-encodes the compressed data of each block; and a decode information appending unit which appends, to data to be output, correction information for the decode time of each group which corresponds to a maximum value of a delay for each group due to the entropy encoding of the compressed data of each block and group information indicative of the group to which each block belongs.

The object and advantages of the invention will be realized and attained by means of the elements and combinations particularly specified in the claims.

It is to be understood that both the foregoing general description and the following detailed description are exemplary and explanatory and are not restrictive of the invention as claimed.

BRIEF DESCRIPTION OF DRAWINGS

FIG. 3 is a diagram schematically illustrating the configuration of an entropy encoding unit;

FIG. 9 is an operation flowchart of a motion video encoding process performed by the motion video encoding apparatus according to the one embodiment.

DESCRIPTION OF EMBODIMENTS

A motion video encoding apparatus according to one embodiment will be described below with reference to drawings. The motion video encoding apparatus reduces a decoding delay by classifying each block contained in the picture into groups, estimating the decode time for each group, and adjusting the amount of code in each of the blocks in the group according to the decode time. The motion video encoding apparatus also corrects the estimated decode time for each group based on the maximum delay time involved in entropy encoding of the compressed data of each block, and notifies a motion video decoding apparatus of the corrected estimated decode time. Thus, the motion video encoding apparatus prevents a receive buffer in the motion video decoding apparatus from underflowing as a result of a delay caused by entropy encoding.

Figure 2:
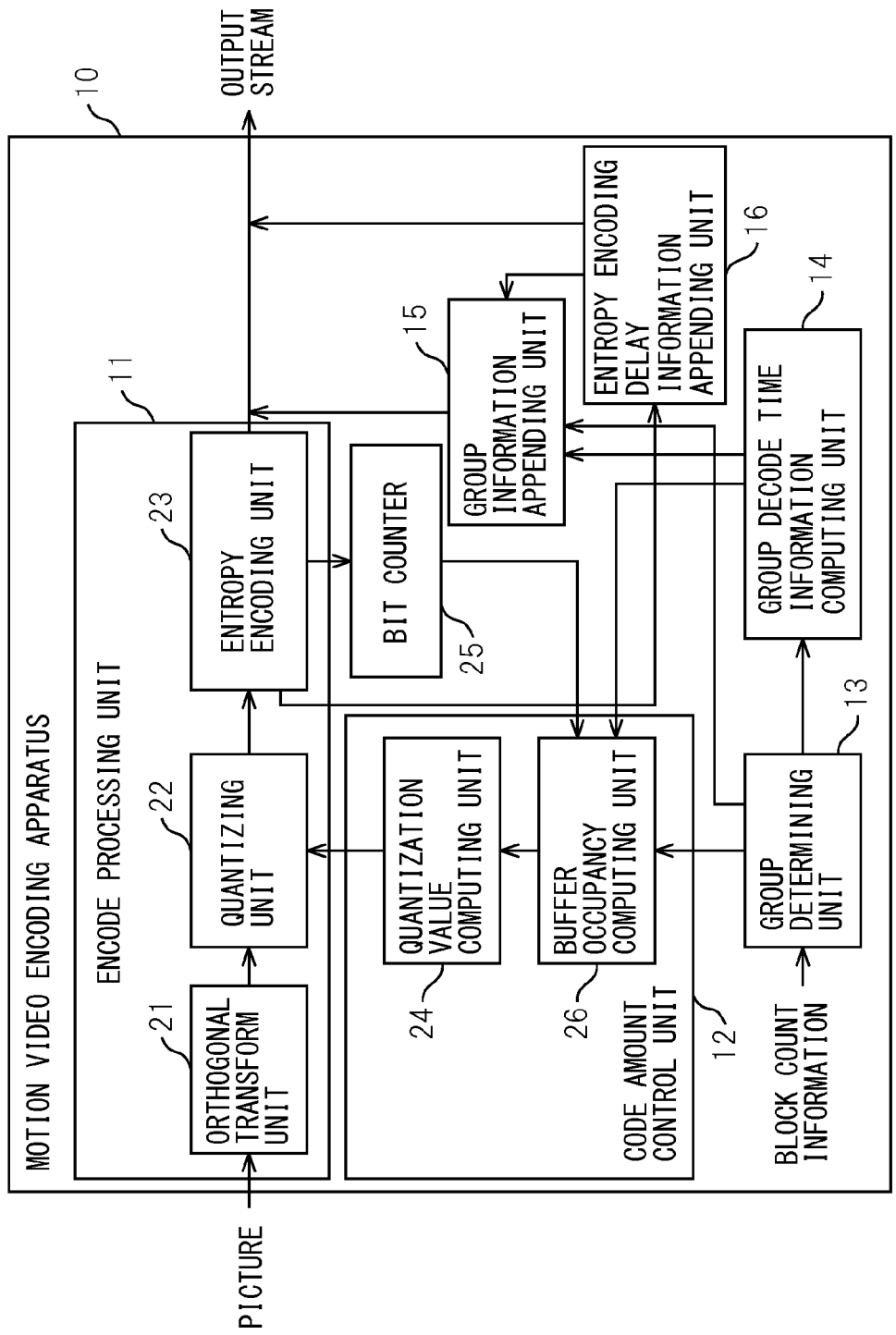
FIG. 2 is a diagram schematically illustrating the configuration of a motion video encoding apparatus according to one embodiment.

FIG. 2 is a diagram schematically illustrating the configuration of the motion video encoding apparatus according to the one embodiment. The motion video encoding apparatus 10 includes an encode processing unit 11, a code amount control unit 12, a group determining unit 13, a group decode time information computing unit 14, a group information appending unit 15, an entropy encoding delay information appending unit 16, and a bit counter 25. These units constituting the motion video encoding apparatus 10 are each implemented as a separate circuit on the motion video encoding apparatus 10. Alternatively, these units constituting the motion video encoding apparatus 10 may be implemented on the motion video encoding apparatus 10 in the form of a single integrated circuit on which the circuits implementing the functions of the respective units are integrated. Further, these units constituting the motion video encoding apparatus 10 may be implemented as functional modules by executing a computer program on a processor incorporated in the motion video encoding apparatus 10.

Each picture contained in motion video data to be encoded is divided into a plurality of blocks by a control unit not illustrated, and supplied to the encode processing unit 11 on a block-by-block basis. Each block contains, for example, 16×16 pixels.

The encode processing unit 11 has an orthogonal transform unit 21, a quantizing unit 22, and an entropy encoding unit 23. A combination of the orthogonal transform unit 21 and the quantizing unit 22 is an example of a compression unit which compresses the data of each block based on the amount of code resulting from entropy encoding of the block.

Each block is input to the orthogonal transform unit 21. The orthogonal transform unit 21 computes a set of frequency coefficients by applying an orthogonal transform such as a discrete cosine transform (DCT) to each block. The set of frequency coefficients thus computed is passed to the quantizing unit 22. When a predicted image is created for each block by motion compensation from a previously encoded picture, a prediction error image generated by computing the difference between the block and the predicted image may be input to the orthogonal transform unit 21.

The picture may be either a frame or a field. A frame refers to one complete still image in the motion video data, while a field refers to a still image obtained by extracting data only in the odd-numbered lines or even-numbered lines from the frame. Further, the encoded motion video can be color motion video or monochrome motion video.

The quantizing unit 22 quantizes each frequency coefficient by dividing the frequency coefficient by the quantization scale determined according to the quantization value computed by a quantization value computing unit 24 provided in the code amount control unit 12. With this quantization, the amount of information needed to represent each frequency coefficient is reduced. The larger the quantization value, the lower the quantization resolution, and the amount of information needed to represent each frequency coefficient becomes correspondingly smaller.

Each frequency coefficient quantized by the quantizing unit 22 is passed to an entropy encoding unit 23. Each quantized frequency coefficient may be inverse-quantized in order to create a predicted image for a picture or a block to be subsequently encoded, and may further be inverse orthogonal-transformed and stored in an image memory not illustrated.

The entropy encoding unit 23 entropy-encodes the compressed data (including quantized frequency coefficients and block header information such as an encode mode) of each block. The entropy encoding unit 23 includes a bit sequence represented by the entropy code in a data stream to be output.

Furthermore, the number of bits in the bit sequence generated by the entropy encoding unit 23 is counted for each block by a bit counter 25 and supplied a buffer occupancy computing unit 26 of the code amount control unit 12 as the amount of code generated. In other words, the amount of code generated in a target block and counted by the bit counter 25 is the difference between the last bit position in a bit sequence output by the entropy encoding unit 23 when the encoding of the immediately preceding block is completed and the last bit position in a bit sequence output by the entropy encoding unit 23 when the encoding of the target block is completed. The actual amount of information generated in each block is larger than the amount of information generated in the block as counted by the bit counter 25, by up to an amount of code corresponding to the entropy encoding unit delay.

The entropy encoding unit 23 according to the present embodiment entropy-encodes the compressed data of each block in accordance with a technique disclosed in JCTVC-A116, "Description of video coding technology proposal by Fraunhofer HHI," Joint Collaborative Team on Video Coding of ITU-T SG16 WP3 and ISO/IEC JTC1/SC29/WG11, April 2010.

The method disclosed in JCTVC-A116, "Description of video coding technology proposal by Fraunhofer HHI," Joint Collaborative Team on Video Coding of ITU-T SG16 WP3 and ISO/IEC JTC1/SC29/WG11, April 2010, basically uses arithmetic coding technology as is the case with Content-based Adaptive Binary Arithmetic Coding (CABAC) formulated in MPEG-4 AVC/H.264. However, the disclosed method uses a plurality of bin encoders based on the estimated probabilities of the individual bits in binarized compressed data, rather than arithmetic-encoding the binarized compressed data on a bit-by-bit basis. Each bin encoder is assigned a different estimated probability, and each bit in the binarized compressed data is arithmetic-encoded by the bin encoder corresponding to its estimated probability.

According to the method, in order to process a bit sequence of a fixed estimated probability, each bin encoder may variable-length encode the compressed data by mapping n input bits into m output bits, rather than actually performing arithmetic encoding operations. Here, m and n are each an integer not smaller than 1. For convenience, in the present specification, the m bits which are output are referred to as a "word". The variable-length encoded compressed data is output in the output data bitstream on a word-by-word basis.

In the method disclosed in JCTVC-A116, "Description of video coding technology proposal by Fraunhofer HHI," Joint Collaborative Team on Video Coding of ITU-T SG16 WP3 and ISO/IEC JTC1/SC29/WG11, April 2010, as in CABAC, the bits in the converted bit sequence do not correspond one for one with the bits in the compressed data before the conversion. Further, a word corresponding to a bin that was input to the bin encoder at an earlier time may appear in the output data bitstream at a position later than a word corresponding to a bin that was input to the arithmetic encoder at a later time.

FIG. 3 is a diagram schematically illustrating the configuration of the entropy encoding unit 23. The entropy encoding unit 23 has a binarizing unit 301, a context modeling unit 302, a probability quantizing unit 303, K bin encoding units 304-1 to 304-k (k is an integer of 2 or larger), and a multiplexing unit 305.

The binarizing unit 301 binarizes each symbol contained in the compressed data of the input block, and expresses each symbol by a bit sequence. For this purpose, the binarizing unit 301 binarizes each symbol in compliance, for example, with the MPEG-4 AVC/H.264. When the macroblock type mType in an I-slice is a symbol "IN×N" that indicates a 4×4 intra-prediction or an 8×8 intra-prediction, for example, the symbol is expressed by "0". On the other hand, when the macroblock type mType is a symbol "IPCM" that indicates PCM coding, the symbol is expressed by "11". The bit sequence output from the binarizing unit 301 is input to the context modeling unit 302.

The context modeling unit 302 assigns a context to each individual bit in the bit sequence input from the binarizing unit 301. The context is determined, for example, based on the compressed data of blocks in the neighborhood. By using a different context when the compressed data of the block to be entropy-encoded is similar to the compressed data of its neighboring blocks than when it is not similar, the efficiency of the arithmetic coding improves. For each bit in the bit sequence, the context modeling unit 302 outputs its value (0 or 1), the least probable bit (LPB) of the assigned context, and the LPB probability, and the thus output bit, LPB, and LPB probability are input to the probability quantizing unit 303. The LPB represents a value whose frequency of occurrence is smaller among the bits in the bit sequence that have previously been output by being paired with the context. The LPB probability is the probability of occurrence of LPB. For example, suppose that the 10 bits contained in the previously output bit sequence are [0, 0, 0, 1, 1, 1, 1, 1, 1, 1]; then, the LPB is 0, and the LPB probability is 0.3.

The probability quantizing unit 303 quantizes the LPB probability of each bit output from the context modeling unit 302. For example, the probability quantizing unit 303 quantizes the probability value continuous from 0 to 1 into a set of K discrete values. For example, when the LPB probability is 0.3, and K is 4, the probability quantizing unit 303 quantizes the LPB probability value of 0.3 to 0.25 (=¼). Each bit output from the probability quantizing unit 303 is input to one of the K bin encoding units 304-1 to 304-K that corresponds to the quantized value of the LPB probability of the bit.

The bin encoding units 304-1 to 304-K arithmetic-encode the bits corresponding to the quantized values of respectively different LPB probabilities. For example, when the quantized value of the LPB probability is ¼, as described above, the bit corresponding to the LPB probability is input to one of the bin encoding units 304-1 to 304-K that corresponds to the discrete probability value of ¼. Then, the bin encoding unit adds the bit to the bit sequence stored at an entry of quantized LPB probability associated with the bit encoding unit among the bit sequences stored at respectively designated entries in a buffer maintained in the multiplexing unit 305. The bin encoding unit converts the bit sequence to a word each time the bit sequence becomes ready for conversion.

The multiplexing unit 305 has, for example, a buffer and stores in the buffer the bit sequence written by each bin encoding unit and the word corresponding to the bit sequence. The multiplexing unit 305 holds the word in the buffer until the word becomes ready for output. When the word becomes ready for output, the multiplexing unit 305 outputs the word as an output data bitstream.

Since it can be assumed that each bit input to the same bin encoding unit has the same LPB, each bin encoding unit and the multiplexing unit may variable-length encode the bit sequence of the plurality of input bits as one bin sequence, rather than arithmetic-encoding each individual bit. In that case, for example, a mapping table that provides a mapping of bit sequences (bin sequences) to words is stored in each bin encoding unit. Then, by referring to the mapping table, the bin encoding unit converts the bin sequence to the corresponding word. For example, when the LPB is "1", and the LPB probability is 0.15 (i.e., the probability of occurrence of "0" is 0.85), the input bin sequence "0000" is converted to "1", and the input bin sequence "11" to "00001".

An embodiment of the entropy encoding unit 23 and the definition of the last bit in a group according to the embodiment will be described. The last bit in the group is defined to be the last bit in the last block within the group.

The last bit in each block in a bitstream of data to be output will be described with reference to FIG. 4A and FIG. 4B.

Figure 4A:
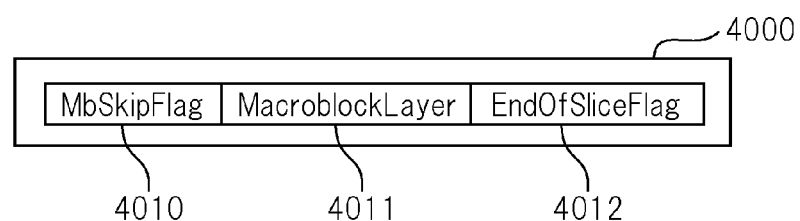
FIG. 4A is a diagram illustrating the structure of compressed data of one block according to a third embodiment.

FIG. 4A is a diagram illustrating the structure of the compressed data of one block. As illustrated in FIG. 4A, compressed data 4000 of one block may include a skip flag 4010, a macroblock layer 4011, and a slice end flag 4012 in this order from the head of the block. The skip flag, the macroblock layer, and the slice end flag are hereinafter expressed as MbSkipFlag, MacroblockLayer, and EndOfSliceFlag, respectively.

The MbSkipFlag 4010 indicates whether the current block is skipped or not. For example, when the current block is skipped, the MbSkipFlag 4010 is set to "1"; on the other hand, when the current block is not skipped, the MbSkipFlag 4010 is set to "0". The MacroblockLayer 4011 is block compressed data containing such information as the type of block encoding, motion vector information, and quantized DCT coefficients. A skipped block means that its MacroblockLayer 4011 is not included in the data stream to be output.

When the picture is an intra-coded picture, the MbSkipFlag 4010 is always a "0", because no block skipping is permitted. Therefore, in this case, the MbSkipFlag 4010 is not included in the data stream to be output.

The EndOfSliceFlag 4012 indicates whether the current block is the last block of the slice. For example, when the current block is the last block of the slice, the EndOfSliceFlag 4012 is set to "1"; on the other hand, when the current block is not the last block, the EndOfSliceFlag 4012 is set to "0".

Figure 4B:
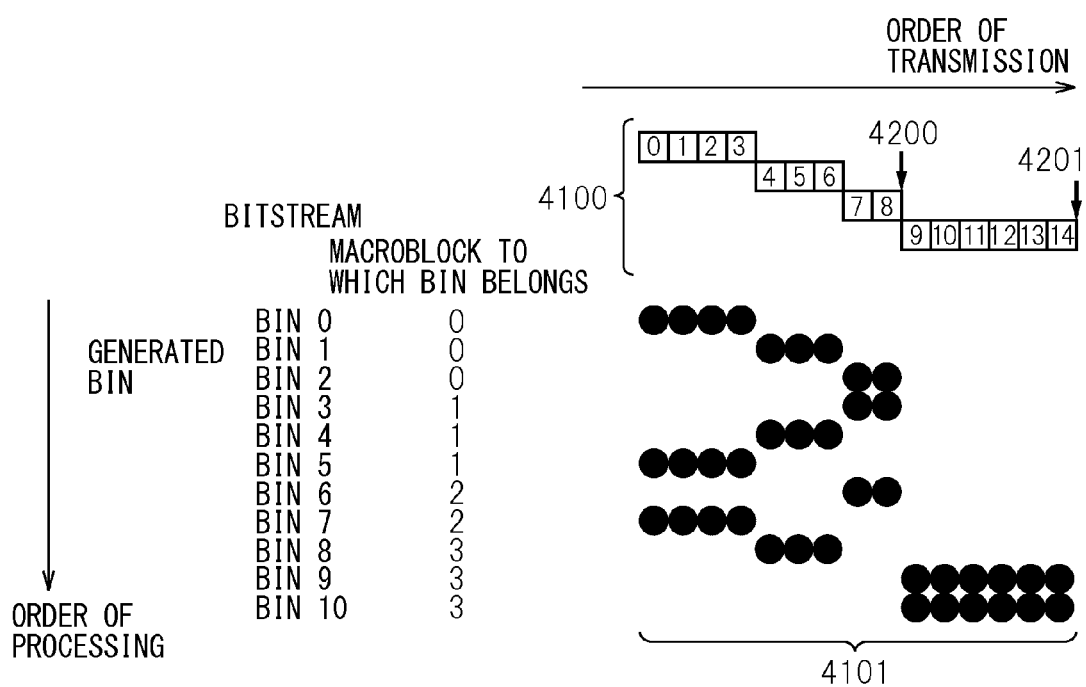
FIG. 4B is a diagram illustrating the relationship between the compressed data and a bit sequence converted by entropy encoding.

FIG. 4B is a diagram illustrating the relationship between the compressed data and the bit sequence converted by variable-length encoding.

As illustrated in FIG. 4B, a bit sequence 4010 as one example of the bit sequence in the data stream to be output contains 15 bits. In this case, a set of dots 4101 represents bins contained in the compressed data that correspond to the respective bits in the bit sequence 4100 and that are obtained by arithmetic-decoding the bit sequence 4100. In the illustrated example, the bit sequence 4100 corresponds with bins 0 to 10. Bins 0 to 2 are contained in block 0, bins 3 to 5 are contained in block 1, bins 6 and 7 are contained in block 2, and bins 8 to 10 are contained in block 3. Each given dot in the set of dots 4101 indicates that the bit contained in the converted bit sequence 4100 and located directly above the given dot is used to decode the bin located to the left of the given dot. For example, bin 0, bin 5, and bin 7 are decoded by using the zeroth to third bits. In other words, three bits in bin 0, bin 5, and bin 7 are converted into four bits in the bit sequence 4100, i.e., the zeroth to third bits.

As is apparent from the set of dots 4101, a bit sequence (bit 0 to bit 3) needed to decode the last bin 5 in block 1 appears in the bitstream 4100 of output data earlier than a bit sequence (bit 7 and bit 8) needed to decode the first bin 3 in block 1. Thus, the order of words on the bitstream of output data may be opposite to the order of the corresponding bins in the block.

The last bit in the block is as follows.

As in the case of encoding of the block by CABAC, the leading bit and last bit in the binarized data in the compressed data of the block are always MbSkipFlag and EndOfSliceFlag. When w blocks are present in the picture, w MbSkipFlag flags and w EndOfSliceFlag flags are invariably present in the bitstream of output data.

However, in the present embodiment, the last bit in a variable-length encoded block x is the last bit in one of the words needed to decode the respective bits in the binarized data in the compressed data of the block x, i.e., a word A located at a rearmost position in the bitstream of output data. In the example illustrated in FIG. 4B, the last bits in block 0, block 1, and block 2 are each the eighth bit in the bit sequence 4100, which is indicated by arrow 4200. Furthermore, the last bit in block 3 is the 14th bit in the bit sequence 4100, which is indicated by arrow 4201.

Figure 5:
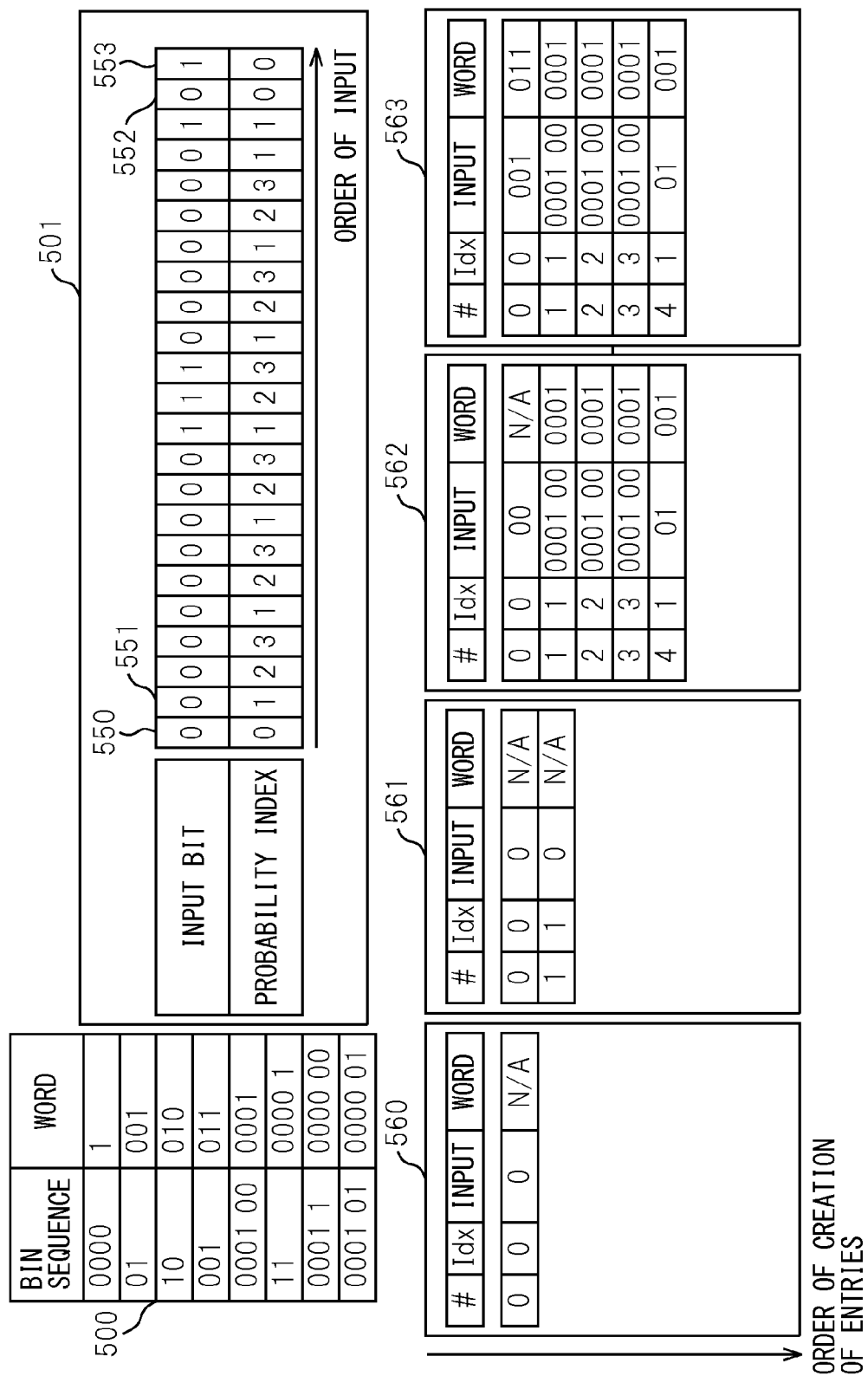
FIG. 5 is a diagram illustrating the behavior of a bin encoding unit and a multiplexing unit in the entropy encoding unit.

FIG. 5 is a diagram illustrating the behavior of the bin encoding units and multiplexing unit in the entropy encoding unit. The bin encoding units 304-1 to 304-K each convert an input bin sequence made up of bits having the same quantized LPB probability into a word by referring to a conversion map 500 for converting input bin sequences into corresponding output words. For simplicity of description, it is assumed that the multiplexing unit 305 uses the same conversion map for all the bin sequences input from the bin encoding units 304-1 to 304-K to the multiplexing unit 305. For example, the bin sequence "0000" is converted to a word "1".

In the illustrated example, a probability index 502 indicating the quantized LPB probability is appended to each bit in the input bit sequence 501 by the probability quantizing unit 303. In the illustrated example, it is assumed that the LPB probability is quantized to one of four values, and each quantized LPB probability is associated with one of probability indices 0 to 3. The bits constituting the input bit sequence 501 are input in sequence, starting with the first bit 550, to the respective bin encoding units corresponding to the probability indices of the respective bits. For example, each bit whose probability index is "0" is input to the bin encoding unit 304-1, and each bit whose probability index is "1" is input to the bin encoding unit 304-2.

Tables 560 to 563 illustrate the data stored in the buffer of the multiplexing unit 305 when the bits 550 to 553 are input to the corresponding bin encoding units. In the tables 560 to 563, each row corresponds to one entry stored in the buffer of the multiplexing unit 305. In each table, the entries are arranged from top to bottom in the order in which the entries were created. The multiplexing unit 305 outputs the words from the respective entries in the buffer sequentially, each in the form of an output data bitstream, by working from the top to the bottom. In each table, "#" indicates the index of each entry in the buffer. Further, "Idx" indicates the index of the corresponding bin encoding unit; in the illustrated example, for ease of understanding, the index of each bin encoding unit has the same value as the probability index appended to the input bit that is input to the bin encoding unit. "INPUT" indicates the input bit sequence (bin sequence). "WORD" indicates the word corresponding to the input bit sequence. When there is no corresponding word for the input bit sequence (for example, when the input bit sequence is "00"), the word is designated "N/A" in each table.

It is assumed that the buffer of the multiplexing unit 305 is empty until the bit 550 is input to the corresponding one of the bin encoding units 304-1 to 304-K. When the bit is input to the corresponding bin encoding unit while the buffer of the multiplexing unit 305 is empty, the bin encoding unit creates a new entry in the buffer of the multiplexing unit 305. In the illustrated example, when the bit 550 whose probability index is "0" and whose value is "0" is input to the bin encoding unit 304-1, the first entry whose entry index is "0" is created in the buffer of the multiplexing unit 305, as illustrated in the table 560. Since the probability index of the bit 550 is "0", "Idx" of this entry is "0". Further, since the value of the bit 550 is "0", the input bit sequence in the first entry is "0". The word in this entry is "N/A", because the word is not completed yet.

Next, the bit 551 whose probability index is "1" and whose value is "0" is input to the bin encoding unit 304-2. In this case, since the entry corresponding to the probability index of this bit does not exist in the buffer of the multiplexing unit 305, a new entry is created, as illustrated in the table 561. "Idx" of this second entry is "1". The word in the second entry is "N/A", because the word is not completed yet.

Subsequently, each time new bits are input to the corresponding bin encoding units, each of the bin encoding units 304-1 to 304-K and the multiplexing unit 305 convert the bin sequence stored at the corresponding entry in the buffer of the multiplexing unit 305 into a word in accordance with the following rules 1) to 4), and output the word as it becomes ready for output from the entry.

1) The bin encoding unit, 304-1 to 304-K, searches through the entries corresponding to the probability index of the input bit in ascending order of the entry indices in the buffer of the multiplexing unit 305.

2) If there is any entry in which the word is "N/A" among the entries corresponding to the probability index of the input bit, the bin encoding unit, 304-1 to 304-K, updates the input bit sequence stored at the entry. More specifically, the bin encoding unit, 304-1 to 304-K, adds the new input bit to the end of the input bit sequence stored at the entry. The multiplexing unit 305 checks to see if the updated bit sequence matches one of the bin sequences in the conversion map 500. If there is a matching bin sequence, the bin encoding unit, 304-1 to 304-K, determines the word in the entry by taking the word corresponding to the bin sequence.

3) If there is no entry in which the word is "N/A" and which corresponds to the probability index of the input bit, the bin encoding unit, 304-1 to 304-K, creates a new entry for the probability index.

4) Any entry in which the word is not "N/A" can be output as a bitstream as it becomes ready for output. However, the entries are output in descending order of the entry indices in the buffer of the multiplexing unit 305. This is a limitation necessary to ensure that the multiplexed words will be correctly decoded at the motion video decoding apparatus (inverse conversion from the words to the corresponding bin sequences). When any entry whose entry index is smaller than that of the entry of interest, and whose word is "N/A", remains in the buffer of the multiplexing unit 305, the multiplexing unit 305 is not permitted to output the entry of interest, even if the word in the entry is not "N/A".

When outputting any given entry, the multiplexing unit 305 adds the word stored in the given entry to the output data bitstream. The entry thus output is removed from the multiplexing buffer.

The table 562 illustrates the state of the buffer of the multiplexing unit 305 when the bit 552 whose probability index is "0" and whose value is "0" is input to the bin encoding unit 304-1. At this point, the entries whose entry indices are "1" to "4" are ready for output. However, since the word in the entry whose entry index is "0" is "N/A", the multiplexing unit 305 is not yet permitted to output all the entry words as the bitstream. This causes a delay in entropy encoding.

The table 563 illustrates the state of the buffer of the multiplexing unit 305 when the bit 553 whose probability index is "0" and whose value is "1" is input to the bin encoding unit 304-1. At this point, for the first time, the word in the entry whose entry index is "0" is no longer "N/A". The multiplexing unit 305 is now permitted to output all the entries whose entry indices are "0" to "4".

As seen in FIG. 5, when the probability index is biased, for example, when, as shown in FIG. 5, a bit with the probability index '0' fails to appear after the leading bit 550 of the input bit sequence, the other entries are forced to wait infinitely to be output.

Thus, to avoid this problem, the entropy encoding unit 23 appends a dummy bit sequence to the input bit sequence of each entry for which the corresponding word is "N/A" when the total number of bits in the words in the entries stored in the buffer of the multiplexing unit 305 exceeds a maximum delay amount $\Delta$. Hence, the entropy encoding unit 23 converts the input bit sequences of all the entries into words to enable all the entries in the buffer to be output. This process is referred to as a flush process.

The motion video encoding apparatus and the motion video decoding apparatus share the status of the buffer of the multiplexing unit for variable-length encoding and variable-length decoding. Thus, when the motion video encoding apparatus 10 transmits the maximum delay $\Delta$ to the motion video decoding apparatus, the motion video decoding apparatus can carry out a flush process in exactly the same manner as that in which the motion video encoding apparatus executes the flush process.

Executing the flush process allows the motion video encoding apparatus 10 to control the upper limit of the total number of bits in the words stored in the buffer of the multiplexing unit 305 and the upper limit of the elapsed time from the input of bits until the corresponding word is output in a bitstream.

Reducing the maximum delay amount $\Delta$ enables a reduction in entropy encoding delay. However, executing the flush process reduces encoding efficiency, because the dummy bit sequence is inserted into the input bit sequence of the entry. Thus, the maximum delay value $\Delta$ is preferably set to a value at which the entropy encoding delay and the encoding efficiency are balanced. For example, the maximum delay value $\Delta$ is preferably set so that ($\Delta$/R) is smaller than the difference in decode time between two consecutive groups. For example, the maximum delay value $\Delta$ is preferably set to 4,096 bits. A bit rate at which a data stream is transmitted from the motion video encoding apparatus 10 to the motion video decoding apparatus is denoted by R.

The maximum delay value $\Delta$ for entropy encoding may be a preset fixed value or a variable that can be set for every picture or for every plural set of pictures.

The group determining unit 13 determines the group to which the block being encoded belongs in accordance with a prescribed method based on block count information received from the control unit (not illustrated). The block count information is information that indicates the number assigned to each given block contained in the picture; for example, the number "1" is assigned to the block located in the upper left corner of the picture, and the subsequent blocks are numbered in sequence in a raster scan order. The largest number is assigned to the block located in the lower right corner of the picture. Alternatively, the block count information may include the number assigned to each given block in accordance with some other ordering scheme.

It is preferable that the group determining unit 13 determines a plurality of groups so that each group contains an equal number of blocks as far as possible in order to make the decode processing time substantially equal for all the groups. For example, when the blocks are grouped on a block line basis, the group determining unit 13 can make the number of blocks contained in each group equal for any given picture size. For example, when the picture size is 1920×1088 pixels corresponding to a high definition television (HDTV) picture, and the block size is 16×16 pixels, the number of block lines is 68. Accordingly, in this case, each given block contained in the picture being encoded is classified as belonging to one of the 68 groups. The number of blocks contained in each group may be any number between 1 and the total number of blocks contained in the entire picture.

The group determining unit 13 sends identification information identifying the group to which the block being encoded belongs to the buffer occupancy computing unit 26 in the code amount control unit 12. Further, the group determining unit 13 notifies the group decode time information computing unit 14 and the group information appending unit 15 of the total number N of groups. The group determining unit 13 may notify the group information appending unit 15 of the index of the block located at the head of each group.

A description will be given below by taking as an example the case in which the blocks are divided equally among N groups on a block line basis, where M denotes the number of blocks contained horizontally in the picture being encoded and N the number of blocks contained vertically therein.

Assuming that the picture being encoded is the i-th picture in the encoding order, the group decode time information computing unit 14 computes the decode time dgt(i,n), i.e., the time at which the n-th group is to be decoded, based on the decode time dt(i) {=t(i)+dly} of the i-th picture which is later by a predetermined delay time dly than the input time t(i) of the i-th picture. Instead of dgt(i,n), the group decode time information computing unit 14 may compute {dgt(i, n)−dgt(i,n−1)} as the decode time which is equivalent to dgt(i,n). Further, the group decode time information computing unit 14 may round the decode time to an appropriate unit, for example, to a multiple of 1/90000 seconds.

The group decode time information computing unit 14 determines the decode time for each group, for example, by dividing the time needed to decode one picture equally among the number N of groups so that the time needed to decode each block becomes equal. In this case, the decode time of the n-th group (n=1, 2, ..., N) is determined in accordance with the following equation.

$$dgt(i,n)=dt(i-1)+\{dt(i)-dt(i-1)\}\cdot n/N \quad (1)$$

The decode processing time need not necessarily be made equal for each group. For example, in the case of the first group to be encoded and decoded, the group decode time information computing unit 14 may determine the decode time dgt(i,1) as indicated by the following equation, i.e., in such a manner that it is delayed relative to the decode time that would be determined by equally dividing the time needed to decode one picture.

$$dgt(i,1) \geq dt(i-1)+\{dt(i)-dt(i-1)\}/N \quad (2)$$

where dt(i) and dt(i−1) are the decode times for the i-th and (i−1)th pictures, respectively.

Further, for each group that is subsequently encoded and decoded, the group decode time information computing unit 14 may determine the decode time dgt(i,n) (n≥2) as indicated by the following equation.

$$dgt(i,n)=dgt(i,1)+\{dt(i)-dgt(i,1)\}\cdot(n-1)/(N-1)(n \geq 2) \quad (3)$$

By thus determining the decode times, the group decode time information computing unit 14 can increase the buffer occupancy to be computed by the buffer occupancy computing unit 26 before starting the encoding of the first group. This provides greater freedom in code amount control. The group decode time information computing unit 14 passes the decode time information containing the decode time of each group to both the buffer occupancy computing unit 26 and the group information appending unit 15.

The code amount control unit 12 controls the amount of code resulting from entropy encoding of the data of each block contained in the group so that data needed to decode all blocks contained in the group arrives at a stream receive buffer by the decode time of the group. To achieve this, the code amount control unit 12 has a quantization value computing unit 24 and a buffer occupancy computing unit 26.

The buffer occupancy computing unit 26 computes an estimate of the buffer occupancy of the stream receive buffer in the idealized decoder. Let the transmission bit rate be denoted by R and the buffer occupancy by d. When the entropy encoding of the current block is completed, the amount of the generated code, b, is reported from the bit counter 25 to the buffer occupancy computing unit 26. Then, the buffer occupancy computing unit 26 subtracts b from d.

After the last block in each group has been encoded, the buffer occupancy computing unit 26 restores the buffer occupancy, d, in accordance with the following equation.

$$d=d+(dgt(i,n+1)-dgt(i,n))\cdot R \quad (4)$$

Each time the entropy encoding of one block is completed, the buffer occupancy computing unit 26 reports the computed buffer occupancy, d, to the quantization value computing unit 24.

Based on the buffer occupancy, the quantization value computing unit 24 computes the quantization value for the block. At this time, the quantization value computing unit 24 controls the quantization value for each block so that the total amount of code resulting from encoding all the blocks in the group does not exceed the buffer occupancy, d, computed just before starting the encoding of the first block in the group, i.e., the value of d does not become negative during the encoding process.

The quantization value computing unit 24 computes the quantization value in accordance, for example, with the quantization value computing method defined in MPEG-2 reference software, Test Model 5 (refer to MPEG-2 Test Model 5, Apr. 1993, ISO-IEC/JTC1/SC29/WG11/N0400 (http:/www.mpeg.org/MPEG/MSSG/tm5/)). Next, the quantization value computing unit 24 compares the buffer occupancy, d, with a predetermined threshold DTH1. When the quantization value is the maximum value it can take within a prescribed range, the threshold DTH1 is given by the following equation.

$$DTH1=b0 \cdot M0+\text{offset} \quad (5)$$

where b0 is the maximum amount of code that can result from each block, and M0 is the number of blocks yet to be encoded in the group to which the block being encoded belongs. In equation (5), offset is a margin term. When d is compared with the threshold DTH1, if d is smaller than DTH1, the quantization value is set to the maximum value.

Alternatively, b0 may be made to represent the amount of code resulting from each block when all the frequency coefficients of the block are assumed to be zero. In this case, if d is smaller than DTH1, the quantization value computing unit 24 determines the quantization value so that all the frequency coefficients of the block being encoded are quantized to zero. By thus performing the control, the receive buffer in the hypothetical decoder does not underflow, as long as the average value of the amount of code resulting from the encoding of the blocks remaining to be encoded in the group does not exceed b0.

In this way, by actually transmitting the output stream from the motion video encoding apparatus 10 at the prescribed rate R to the motion video decoding apparatus, the code amount control unit 12 can control the code amount of the motion video data so that the receive buffer in the motion video decoding apparatus does not underflow. The quantization value computing unit 24 passes the computed quantization value to the quantizing unit 22.

Furthermore, the entropy encoding unit 23 communicates the maximum delay value Δ for entropy encoding to the entropy encoding delay information appending unit 16. The maximum delay value Δ for entropy encoding is in bits. Alternatively, the entropy encoding delay information appending unit 16 may store the maximum delay value Δ for entropy encoding in a memory provided in the entropy encoding delay information appending unit 16.

The entropy encoding delay information appending unit 16 appends the maximum delay value Δ for entropy encoding to the header information in the data stream to be output for every picture or for every predetermined number of pictures. The header information may be, for example, a picture header specified in MPEG-2 or a slice header specified in H.264. The entropy encoding delay information appending unit 16 also notifies the group information appending unit 15 of the maximum delay value Δ for entropy encoding.

The group information appending unit 15 and the entropy encoding delay information appending unit 16 are an example of a decoding information appending unit which appends information used to decode the picture to the output stream.

The motion video encoding apparatus 10 shares information concerning the group to which each block belongs and the decode time of each group with the motion video decoding apparatus. For this purpose, the motion video encoding apparatus 10 appends at least group information identifying the blocks belonging to each group and decode time information containing the decode time of each group to the data stream to be output. Thus, the group information appending unit 15 sends the group information and the decode time information to the motion video decoding apparatus.

The group information appending unit 15 appends the group information to the header information of the output data stream, for example, for every picture or for every predetermined number of pictures.

The MPEG-2 Sequence Header or the H.264 Sequence Parameter Set or Supplemental Enhancement Information, for example, may be used as the header information. The decode time of each group may be appended to the header information, such as the MPEG-2 Picture Header or the H.264 Slice Header, that is invariably attached to each picture.

When the groups are determined so that each group contains an equal number of blocks, the motion video encoding apparatus 10 notifies the motion video decoding apparatus that all the blocks have been divided equally among the N groups. For this purpose, the group determining unit 13 sends information about the number of groups, N, as group information to the group information appending unit 15. The group information appending unit 15 encodes this group information. In MPEG-2 and H.264, encoding is performed on a block-by-block basis, called macroblocks each comprising 16×16 pixels, and usually the number of blocks does not exceed a range that can be expressed by 20 bits. Since the maximum number N of groups is at most equal to the maximum number of blocks, N may also be encoded with a fixed bit length.

On the other hand, when the number of blocks contained in each group is not always equal, the group determining unit 13 sends index information indicating the starting block in each group, along with the number of groups, N, as the group information to the group information appending unit 15. The group information appending unit 15 first encodes the number of groups, N, and then encodes the index information of the starting block in each group in sequence. A fixed bit length encoding scheme, for example, is also used to encode the index information of the starting block. Alternatively, the group information appending unit 15 may use other encoding schemes, for example, a variable-length encoding scheme such as Huffman encoding, to encode the number of groups, N, and the index information of the starting block in each group.

Moreover, the group decode time information computing unit 14 notifies the group information appending unit 15 of the decode time dgt(i,j) for each group used by the buffer occupancy computing unit 26 to compute the buffer occupancy. The group decode time information computing unit 14 may compute the decode time in the form of the difference value dgt(i,n)−dgt(i,n−1) for each of the N groups starting with the first group and ending with the last N-th group, and send the computed decode time information to the group information appending unit 15. For the decode time of the first group, dgt(i,0) is set equal to the decode time dgt(i−1, N){=dt(i−1)} of the last group in the immediately preceding picture.

The group information appending unit 15 corrects the decode time dgt(i,j) for each group used to compute the buffer occupancy, in accordance with equations described below using the maximum delay value Δ for entropy encoding. The corrected decode time dgt'(i,j) is an example of decode time correction information and used by the motion video decoding apparatus. In the equations, a transmission bit rate is denoted by R.

$$dgt'(i,N-1)=dgt(i,N-1)$$

$$dgt'(i,j)=dgt(i,j)+(\Delta/R) \qquad (6)$$

As is apparent from equation (6), the decode times for the groups in the picture other than the last group are corrected to be delayed by a value proportional to the maximum delay value Δ for entropy encoding.

According to the present embodiment, as is described above, the maximum delay value Δ for entropy encoding is preferably set such that (Δ/R) is smaller than {dgt(i,j)−dgt(i,j−1)}. When the maximum delay value Δ is large, the motion video encoding apparatus 10 can always satisfy such condition by reducing the number of groups N.

The group information appending unit 15 encodes the difference {dgt'(i,j)−dgt'(i,j−1)} in the corrected decode time dgt'(i,j) between each group, and appends the encoded decode time to the current picture data which is sent to the motion video decoding apparatus. The group information appending unit 15 may quantize each difference value with a suitable quantization resolution, for example, a resolution of 1/90000 seconds, and then encode it with a fixed bit length of 32 bits or so. While the above has described as an example of encoding using a fixed bit length, the group information appending unit 15 may encode the difference value representing the decode time of each group by using a suitable variable-length encoding scheme.

The motion video decoding apparatus calculates the amount of display delay based on the number of groups N and the decode time information for each group, which have been notified by the motion video encoding apparatus. The corrected decode time included in the notified the decode time information for each group is a value obtained taking a possible entropy encoding delay into account. Thus, the motion video decoding apparatus is prevented from underflowing, even when an entropy encoding delay makes the time when the last bit in each group actually arrives at the motion video decoding apparatus later than the decode time used for control by the code amount control unit 12 of the motion video encoding apparatus 10. Therefore, even when a delay results from entropy encoding of the compressed data of the blocks in each group, the motion video decoding apparatus can decode the group normally. When the groups are determined so that each group contains an equal number of blocks, the amount of display delay is ct/N, where ct is the worst-case processing time needed to decode one picture.

Next, referring to FIG. 6 to FIG. 8, a description will be given of how the motion video encoding apparatus 10 according to the above-described embodiment can reduce the delay that occurs when the motion video decoding apparatus decodes the motion video.

For easier understanding, first, a case will be described in which the entropy encoding delay is substantially '0'. FIG. 6 is a diagram illustrating how the buffer occupancy of the receive buffer for storing the encoded motion video data stream received from the motion video encoding apparatus 10 varies as a function of time. FIG. 7 is a diagram illustrating how the buffer occupancy of the receive buffer varies as a function of time when the decode time of the first group is delayed. In FIG. 6 and FIG. 7, the abscissa represents the time, and the ordinate represents the buffer occupancy. It is assumed that the number of groups, N, is 4. In FIG. 6, graph 600 illustrates the variation of the buffer occupancy as a function of time. Each period indicated by arrow 601 represents the maximum time ct/N that may be needed to decode the corresponding group. Similarly, in FIG. 7, graph 700 illustrates the variation of the buffer occupancy as a function of time.

The motion video encoding apparatus 10 controls the amount of code for each block so that the data needed for decoding the blocks contained in the n-th group will arrive at the receive buffer by the time dgt(i,n) given by the earlier stated equation (1). The following relation holds between the worst-case processing time ct needed to decode one picture and the decode time $dt(i-1)\{=dgt(i-1,N)\}$ of the (i−1)th picture and decode time $dt(i)\{=dgt(i,N)\}$ of the last group in the i-th picture.

$$ct \geq \{dt(i) - dt(i-1)\} \quad (7)$$

Figure 6:
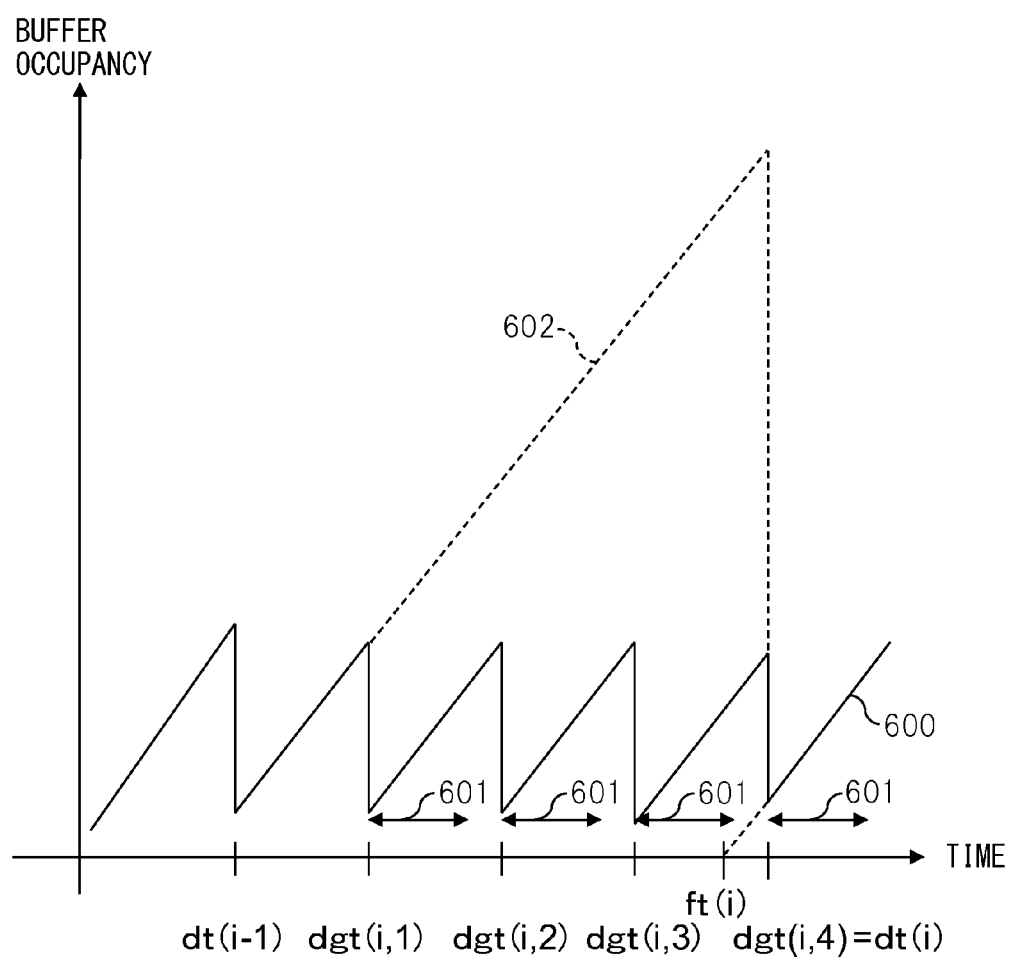
FIG. 6 is a diagram illustrating how the buffer occupancy of a receive buffer for storing an encoded motion video data stream received from the motion video encoding apparatus according to the one embodiment varies as a function of time.
Figure 7:
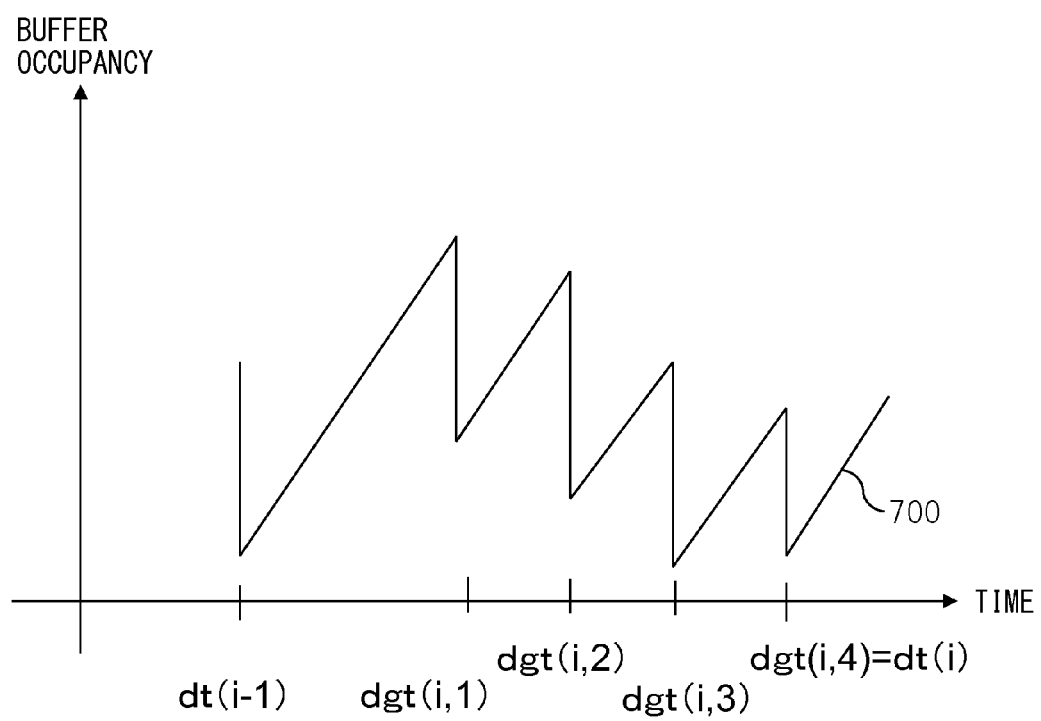
FIG. 7 is a diagram illustrating how the buffer occupancy of the receive buffer varies as a function of time when the decode time of the first group is delayed.

When each group contains an equal number of blocks, since the following relation holds as illustrated in FIG. 6, the decoding process for the blocks contained in the first to (N−1)th groups in the i-th picture will be completed by the decode time dgt(i,N) of the last group in the i-th picture.

$$dgt(i,n+1) \geq dgt(i,n) + ct/N \quad (8)$$

Suppose that the data needed for decoding the blocks contained in the N-th group arrives at the receive buffer in the motion video decoding apparatus at time dgt(i,N), whereupon the decoding of the N-th group is started; in this case, the processing time needed for decoding is ct/N. This means that the decoding of all the blocks will be completed at the time given by the following equation, thus making the picture ready for display. In this way, the display delay time relative to the idealized decoder is reduced from ct to ct/N.

$$dgt(i,N) + ct/N = dt(i) + ct/N \quad (9)$$

Figure 1:
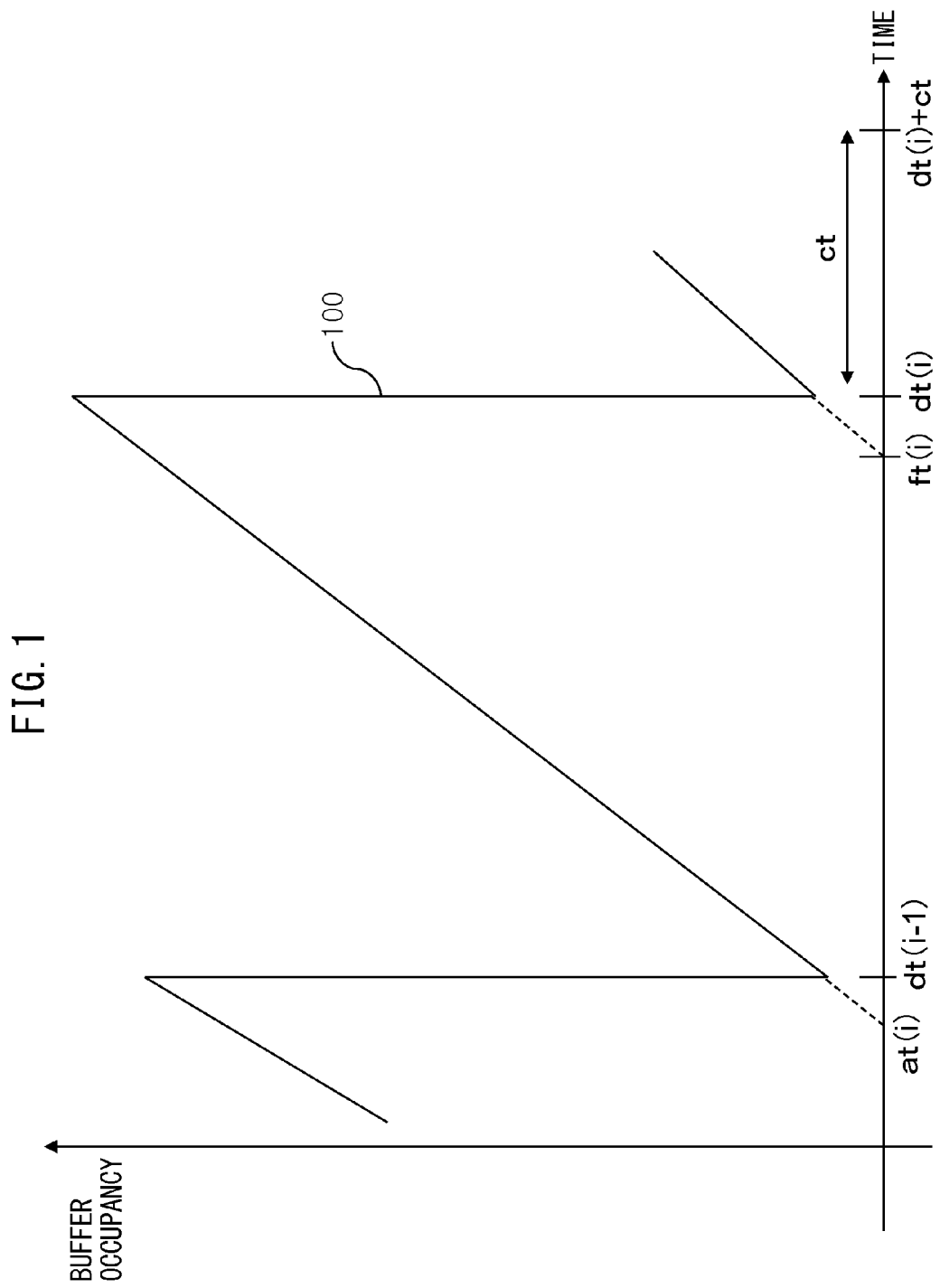
FIG. 1 is a diagram illustrating the buffer occupancy of a receive buffer according to the prior art as a function of time.

When the decode time is computed on a group-by-group basis, the decode time dgt(i,1) of the first group in the i-th picture becomes earlier by $\{dt(i)-dt(i-1)\}(N-1)/N$ than the decode time dt(i) of the i-th picture. As a result, as can be seen from the per-picture buffer occupancy illustrated in FIG. 1 and indicated by dashed line 602 in FIG. 6, the occupancy of the receive buffer is reduced compared with the prior art, and the amount of code usable for each group decreases, while at the same time, the degree of freedom in distributing the amount of code among the groups decreases. In the case of decoding each picture with a short delay approximately equal to the display period of one picture after the data of the picture has been input to the receive buffer, as illustrated in FIG. 1, the effects of reduced buffer occupancy become more pronounced, since the buffer occupancy becomes smaller.

To avoid such a problem, it is preferable to delay the decode time of the first group, as indicated by the earlier given equation (2), for the purpose of restoring the buffer occupancy. By delaying the decode time of the first group, the number of bits that can be transmitted into the buffer increases as illustrated in FIG. 7, and the degree of freedom in controlling the amount of code generated for each picture can be increased. In this case, the latest decode completion time is given by the following equation.

$$\min(dgt(i,1)+ct, dt(i)+ct/N) \quad (10)$$

The function min(x,y) is a function that returns the value of the variable x or y, whichever is smaller.

As can be seen by comparing the equation (10) with the equation (9), if the decode time of the first group is delayed, the delay does not increase in the case of a motion video decoding apparatus in which ct is sufficiently short, while in the case of a motion video decoding apparatus in which ct is large, the delay becomes larger than when the decode time of the first group is not delayed.

As described above in the embodiment, when the decode time of the motion video decoding apparatus is delayed by a correction amount equivalent to the maximum delay value for entropy encoding unit, the receive buffer of the motion video decoding apparatus is prevented from underflowing. This will be described with reference to FIG. 8.

Figure 8:
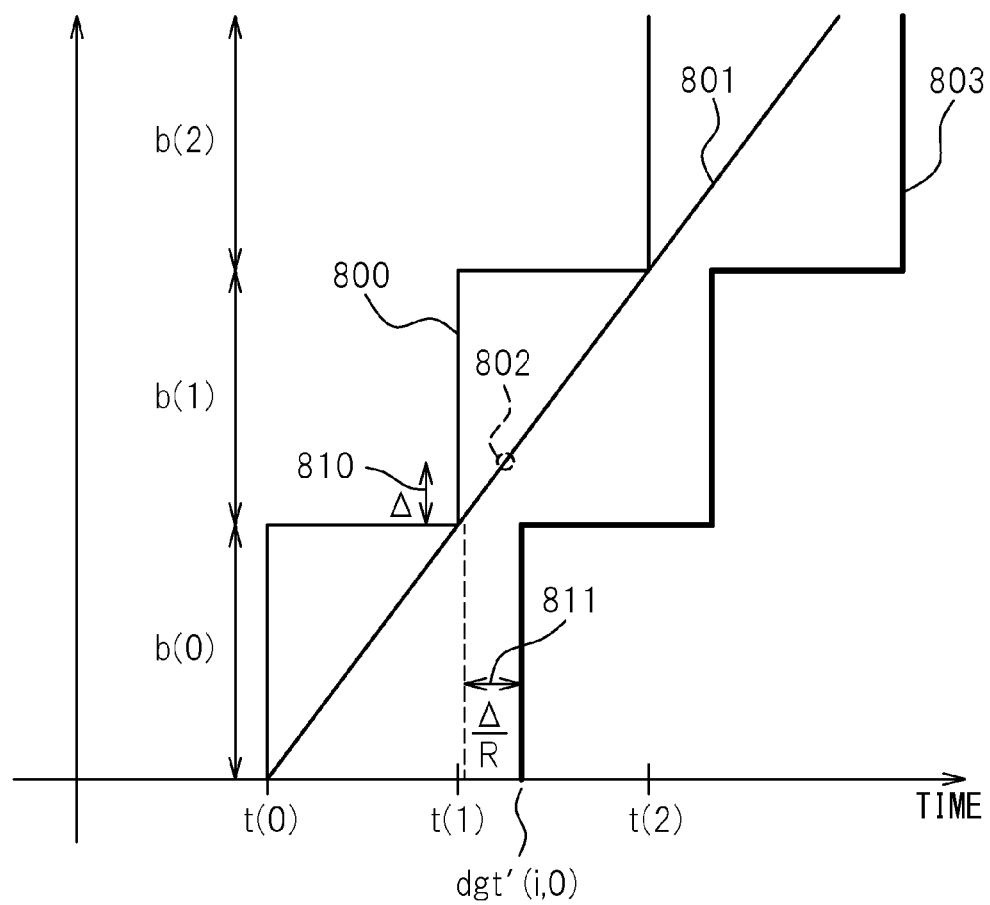
FIG. 8 is a graph illustrating how the amount of information generated by the motion video encoding apparatus and the amount of information decoded by the motion video decoding apparatus vary as a function of time.

FIG. 8 is a graph illustrating how, instead of the buffer occupancy, the amount of information generated by the motion video encoding apparatus and the amount of information decoded by the motion video decoding apparatus vary as a function of time. In FIG. 8, the abscissas represents time, and the ordinate represents the amount of information generated by the motion video encoding apparatus and the amount of information decoded by the motion video decoding apparatus.

A graph 800 represents the accumulated value of the amount of information generated in a transmit buffer. At time t(0), encoding of the zeroth group in the i-th picture is completed. At time t(0), the entropy-encoded data of the zeroth group in the i-th picture, for which the number of bits is b(0), is instantaneously input to the transmit buffer. In this case, it is assumed that, by entropy encoding delay, the word corresponding to the last bin in the zeroth group in the picture has not yet been output from the entropy encoding unit 23 as a bitstream. As a result, δ bits remain in the buffer of the multiplexing unit 305 of the entropy encoding unit 23. In other words, the bit sequence, except for the last δ bits, in the entropy-encoded data of the zeroth group in the picture is stored in the transmit buffer. The remaining δ bits indicated by arrow 810 are input to the transmit buffer at time t(1) together with the encoded data of the first group in the i-th picture.

A graph 801 represents the accumulated value of the number of bits transmitted from the transmit buffer of the motion video encoding apparatus to the receive buffer of the motion video decoding apparatus. The difference between the graph 801 and the graph 800 in the ordinate direction corresponds to the buffer occupancy of the transmit buffer.

From the moment the encoded data of the zeroth group in the picture is input to the transmit buffer, the encoded data is transmitted to the received buffer at a specified bit rate R without delay. The time at which the word corresponding to the last bin in the zeroth group in the picture is transmitted to the receive buffer is a point of time 802 corresponding to an amount of time from time t(1) which is needed to transmit δ bits at the bit rate R.

A graph 803 represents the accumulated value of the amount of information decoded in the motion video decoding apparatus. When the time needed to transmit the amount of information generated per group elapses from time t(0), the motion video decoding apparatus instantaneously retrieves the encoded data of the zeroth group in the picture from the receive buffer. The motion video decoding apparatus then decodes each of the blocks contained in the zeroth group. When the motion video decoding apparatus starts decoding a time t(1) {=dgt(i,0)}, the bits corresponding to the last bin in the zeroth group in the picture are still absent in the receive buffer. Thus, the buffer underflows.

However, according to the present embodiment, the time at which the groups in the picture other than the last group start to be decoded is equal to time when t(j+1) (j=0, 1, . . . , N−2) is delayed by an amount of time (Δ/R) indicated by arrow 811, i.e., time dgt'(i,j). Thus, at time dgt'(i,0) when time t(1) is delayed by an amount of time (Δ/R), the bits corresponding to the last bin in the zeroth group in the i-th picture have already arrived at the receive buffer. Thus, the motion video decoding apparatus can decode the blocks in each group in the picture without buffer underflow. For the last group in the picture, all of the encoded data of the last group is entropy-encoded and input to the transmit buffer without the need to wait for the data of the next picture to be encoded. Hence, the motion video decoding apparatus can start decoding the last group at time t(N) {=dgt(i,N−1)} when all of the coded data of the last group is input to the receive buffer. Consequently, a delay in the display time with respect to the idealized decoder has a value expressed by equation (9) or equation (10).

FIG. 9 is an operation flowchart of the motion video encoding process performed by the motion video encoding apparatus 10 according to the one embodiment. The motion video encoding apparatus 10 performs the following motion video encoding process for each picture.

The group determining unit 13 determines the group to which each block belongs (step S101). The group determining unit 13 sends identification information identifying the group to which the block belongs to the buffer occupancy computing unit 26 in the code amount control unit 12. Further, the group determining unit 13 notifies the group decode time information computing unit 14 and the group information appending unit 15 of the total number N of groups. The group determining unit 13 may notify the group information appending unit 15 of the index of the block located at the head of each group.

Next, the group decode time information computing unit 14 computes the decode time for each group (step S102). The group decode time information computing unit 14 passes information indicating the decode time of each group to the buffer occupancy computing unit 26 and the group information appending unit 15.

Furthermore, the entropy encoding delay information appending unit 16 acquires the maximum delay value Δ for entropy encoding from the entropy encoding unit 23 (step S103). The maximum delay value Δ for entropy encoding is communicated from the entropy encoding delay information appending unit 16 to the group information appending unit 15.

Then, the group information appending unit 15 corrects the group decode time notified from the group decode time information computing unit 14 based on the maximum delay value Δ for entropy encoding transmitted by the entropy encoding delay information appending unit 16 (step S104). The group information appending unit 15 encodes the group information indicative of the group to which each block belongs and the decode time information including the corrected decode time. The group information appending unit 15 then appends the encoded group information and decoded time information to the data stream to be output.

Furthermore, the entropy encoding delay information appending unit 16 appends the maximum delay value Δ for entropy encoding to the data stream to be output (step S105).

On the other hand, the buffer occupancy computing unit 26 estimates the buffer occupancy that is expected for the receive buffer at the decode time of each group for the case where the data needed for decoding all of the blocks contained in the group are transmitted to the motion video decoding apparatus at a predetermined transmission rate (step S106). The decode time referenced by the buffer occupancy computing unit 26 has a value obtained without taking a possible entropy encoding delay into account, i.e., the uncorrected decode time. In this case, the buffer occupancy computing unit 26 refers to the information received from the bit counter 25 representing the amount of code of the so far encoded blocks within the group. Then, the buffer occupancy computing unit 26 passes information representing the estimated buffer occupancy to the quantization value computing unit 24 in the code amount control unit 12. The quantization value computing unit 24 controls the amount of code for each block contained in the group so that all of the data needed for decoding the group will arrive at the stream receive buffer in the motion video decoding apparatus by the decode time of the group (step S107). Then, the quantization value computing unit 24 computes code amount control information by computing the quantization value corresponding to the amount of code, and passes the computed quantization value to the quantizing unit 22 in the encode processing unit 11.

The orthogonal transform unit 21 in the encode processing unit 11 computes a set of frequency coefficients for each block by performing an orthogonal transform on each block (step S108). The orthogonal transform unit 21 passes the set of frequency coefficients of each block to the quantizing unit 22.

The quantizing unit 22 quantizes the set of frequency coefficients of each block, based on the quantization value computed as the code amount control information (step S109), and passes each quantized frequency coefficient to the entropy encoding unit 23 in the encode processing unit 11. The entropy encoding unit 23 entropy-encodes each quantized frequency coefficient (step S110), and outputs the resulting entropy code. The entropy code is stored in the output data stream along with the group information, decode time information, etc., output from the group information appending unit 15. The entropy encoding unit 23 supplies the amount of code for each block to the bit counter 25. After step S110, the motion video encoding apparatus 10 terminates the motion video encoding process.

As has been described above, the motion video encoding apparatus can reduce a decoding delay by dividing the picture into blocks, classifying the blocks into groups, estimating the decode time for each of the groups, and adjusting the amount of code in each of the blocks contained in the group according to the estimated decode time. Moreover, the motion video encoding apparatus corrects the decode time based on the maximum delay of entropy encoding, and notifies the motion video decoding apparatus of the corrected decode time. Thus, the receive buffer can be prevented from underflowing even when an entropy encoding delay occurs.

According to a modified example, the entropy encoding delay information appending unit 16 may append the amount of correction of the decode time (Δ/R) to the header information in the data stream to be output, for every picture or for every predetermined number of pictures as decode time correction information, together with the maximum delay value Δ for entropy encoding. In this case, the header information may also be, for example, a picture header specified in MPEG-2 or a slice header specified in H.264.

In this case, the group information appending unit 15 directly encodes the decode time for each group output by the group decode time information computing unit 14 without correcting the decode time, and appends the encoded decode time to the data stream to be output. The motion video decoding apparatus corrects the decode time for each group appended by the group information appending unit 15 to the data stream to be output, in accordance with equation (6) described above using the amount of correction of the decode time (Δ/R). The motion video decoding apparatus decodes the decode time for each group by taking a possible entropy encoding delay into account.

Moreover, the entropy encoding unit 23 is not limited to the above-described scheme but may encode each group in accordance with any other encoding scheme which may cause a delay with a predetermined maximum value or smaller when each group is encoded.

A computer program which is executed on a computer to implement the function of each unit constituting the motion video encoding apparatus according to each of the above embodiments or their modified examples may be distributed in the form stored in a semiconductor memory or in the form recorded on a recording medium such as an optical recording medium.

The motion video encoding apparatus according to each of the above embodiments or their modified examples is used in various applications. For example, the motion video encoding apparatus is incorporated in a video camera, a video transmitting apparatus, a video receiving apparatus, a videophone system, a computer, or a mobile telephone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to superiority or inferiority of the invention. Although the embodiments of the present invention have been described in detail, it should be understood that various changes, substitutions, and alterations can be made hereto without departing from the spirit and scope of the invention.

What is claimed is:

1. A motion video encoding apparatus for encoding each picture contained in motion video data by dividing the picture into a plurality of blocks, the motion video encoding apparatus comprising:
  a group determining unit which determines, for each block, a group to which the block belongs, among a plurality of groups into which the picture is divided;
  a group decode time information computing unit which computes a decode time for each group;
  a code amount control unit which controls, for each group, an amount of code resulting from entropy encoding of data of each block contained in the group so that data needed for decoding all of the blocks contained in the group will arrive at a stream receive buffer provided in a motion video decoding apparatus by the decode time of the group computed by the group decode time information computing unit when the data is transmitted to the motion video decoding apparatus at a prescribed transmission rate;
  a compression unit which compresses the data of each block based on the amount of code of the block;
  an entropy encoding unit which entropy-encodes the data of each block compressed by the compression unit and accumulates a number of bits in the data to be output; and
  a decode information appending unit which appends, to data to be output, correction information for the decode time of each group which corresponds to a maximum value of a delay for each group due to the entropy encoding by the entropy encoding unit and group information indicative of the group to which each block belongs, the correction information including the decode time of each group and an amount of correction of the decode time which corresponds to the maximum value of the delay of each group and is obtained by dividing a maximum number of bits in the data to be output by the prescribed transmission rate.

2. The motion video encoding apparatus according to claim 1, wherein the decode information appending unit further appends the maximum value of the delay to the data to be output.

3. The motion video encoding apparatus according to claim 1, wherein the decode information appending unit corrects the decode time of each group by an amount of time corresponding to the maximum value of the delay and appends corrected decode time to the data to be output, as the correction information.

4. The motion video encoding apparatus according to claim 3, wherein, only for a last group in each picture, the decode information appending unit computes the corrected decode time of the last group by setting the maximum value of the delay to zero.

5. A motion video encoding method for encoding each picture contained in motion video data by dividing the picture into a plurality of blocks, the motion video encoding method comprising:
  determining, for each block, a group to which the block belongs, among a plurality of groups into which the picture is divided;
  computing a decode time for each group;
  controlling, for each group, an amount of code resulting from entropy encoding of data of each block contained in the group so that data needed for decoding all of the blocks contained in the group will arrive at a stream receive buffer provided in a motion video decoding apparatus by the decode time of the group when the data is transmitted to the motion video decoding apparatus at a prescribed transmission rate;
  compressing the data of each block based on the amount of code of the block;
  entropy-encoding, by an entropy-encoder, the compressed data of each block;
  accumulating, by the entropy-encoder, a number of bits in the data to be output; and
  appending, to data to be output, correction information for the decode time of each group which corresponds to a maximum value of a delay for each group due to the entropy encoding of the compressed data of each block and group information indicative of the group to which each block belongs, the correction information including the decode time of each group and an amount of correction of the decode time which corresponds to the maximum value of the delay of each group and is obtained by dividing a maximum number of bits in the data to be output by the prescribed transmission rate.

6. The motion video encoding method according to claim 5, further comprising: appending the maximum value of the delay to the data to be output.

7. The motion video encoding method according to claim 5, wherein the appending correction information for the decode time of each group corrects the decode time of each group by an amount of time corresponding to the maximum value of the delay and appends corrected decode time to the data to be output, as the correction information.

8. The motion video encoding method according to claim 7, wherein, only for a last group in each picture, the appending correction information for the decode time of each group computes the corrected decode time of the last group by setting the maximum value of the delay to zero.

9. A non-transitory computer-readable recording medium having recorded thereon a motion video encoding computer program for causing a computer to execute encoding each picture contained in motion video data by dividing the picture into a plurality of blocks, wherein the computer program includes instructions for causing the computer to implement:

determining, for each block, a group to which the block belongs, among a plurality of groups into which the picture is divided;

computing a decode time for each group;

controlling, for each group, an amount of code resulting from entropy encoding of data of each block contained in the group so that data needed for decoding all of the blocks contained in the group will arrive at a stream receive buffer provided in a motion video decoding apparatus by the decode time of the group when the data is transmitted to the motion video decoding apparatus at a prescribed transmission rate;

compressing the data of each block based on the amount of code of the block;

entropy-encoding the compressed data of each block;

accumulating, by the entropy-encoder, a number of bits in the data to be output; and appending, to data to be output, correction information for the decode time of each group which corresponds to a maximum value of a delay for each group due to the entropy encoding of the compressed data of each block and group information indicative of the group to which each block belongs, the correction information including the decode time of each group and an amount of correction of the decode time which corresponds to the maximum value of the delay of each group and is obtained by dividing a maximum number of bits in the data to be output by the prescribed transmission rate.

* * * * *